(12) United States Patent
Lu

(10) Patent No.: US 7,333,354 B2
(45) Date of Patent: Feb. 19, 2008

(54) SWITCH FOR POWER FACTOR CORRECTION CIRCUITS

(75) Inventor: Wen-Ching Lu, Taipei Hsien (TW)

(73) Assignee: Sun Trans Electronics Co., Ltd., Taipei County (TW)

( * ) Notice: Subject to any disclaimer, the term of this patent is extended or adjusted under 35 U.S.C. 154(b) by 7 days.

(21) Appl. No.: 11/219,857

(22) Filed: Sep. 7, 2005

(65) Prior Publication Data

US 2007/0052401 A1    Mar. 8, 2007

(51) Int. Cl.
*H02M 3/18* (2006.01)
(52) U.S. Cl. .................. 363/61; 363/143; 323/222
(58) Field of Classification Search .............. 363/61, 363/59, 17, 126, 125, 43, 16, 19, 143, 53, 363/48; 323/222, 299, 259, 290; 361/78–79
See application file for complete search history.

(56) References Cited

U.S. PATENT DOCUMENTS 6,608,770 B2 *   8/2003   Vinciarelli et al. ........... 363/61

FOREIGN PATENT DOCUMENTS

TW            291130       11/1996

\* cited by examiner

*Primary Examiner*—Rajnikant B. Patel
(74) *Attorney, Agent, or Firm*—Birch, Stewart, Kolasch & Birch, LLP

(57) ABSTRACT

An improved switch for power factor correction circuits includes a six-terminal switch which has a first inductor connecting to a selection line which has a first switch terminal and a second switch terminal, and a second inductor connecting to a conductive line. When the switch is at a first position, the selection line is connected to the first switch terminal, and the conductive line is closed to determine the first and second inductors in a parallel coupling condition and the power conversion circuit in a first duty condition. When the switch is at a second position, the selection line is connected to the second switch terminal and the conductive line is open to determine the first and second inductors in a serial coupling condition, and the power conversion circuit in a second duty condition.

14 Claims, 9 Drawing Sheets

SWITCH FOR POWER FACTOR CORRECTION CIRCUITS

FIELD OF THE INVENTION

The present invention relates to an improved switch for power factor correction circuits and particularly to a common six-terminal switch to form a serial coupling and a parallel coupling for a first inductor and a second inductor of a power factor correction circuit and determine a power conversion circuit in a first duty condition and a second duty condition.

BACKGROUND OF THE INVENTION

R.O.C. patent publication No. 291130 discloses a "Power supply power factor correction apparatus" which provides a circuit design to solve "resonant wave distortion" occurred to the first inductor and the second inductor on a conventional power factor correction circuit when the power conversion circuit is in different duty conditions. It proposes a power supply selection device which has nine terminals. The power supply selection device consists of two ON-OFF switches and a switch. One of the two ON-OFF switches aims to select the duty condition (input power voltage of 110V or 220V) of the power conversion circuit, while another ON-OFF switch aims to open or close the circuit. The switch is to make two inductors of the power factor correction circuit in a parallel coupling condition or a serial coupling condition when the power conversion circuit is in different duty conditions. Thereby when input power supply is in a high voltage duty condition, the inductors are coupled in series to increase the inductance and improve the problem of "resonant wave distortion", and when the input power supply is in a low voltage duty condition, the inductors are coupled in parallel to divide the larger current and protect the circuit.

However, the aforesaid technique does not cover the conventional six-terminal switches, and nine-terminal switches must be used. To switch parallel or serial coupling of the inductors, a separated nine-terminal switch has to be fabricated. The production and design costs are higher than the six-terminal switch. Moreover, the nine-terminal switch has a bigger size than the six-terminal switch. To allocate more space on the general power supply panel to install such type of switch is difficult. Hence the applicability of that technique is limited in the present industry condition. It is not widely accepted.

SUMMARY OF THE INVENTION

Therefore the primary object of the present invention is to solve the aforesaid disadvantages. The invention aims to maintain the existing six-terminal switch design, but provides a novel circuit design so that it is readily applicable as a power supply selection line in the present industry condition. When it is used without a power factor correction circuit, it still can function as an ordinary power supply selection line, thus can achieve maximum economic effectiveness.

The invention aims to provide a six-terminal switch which has a first inductor connecting to a selection line which has a first switch terminal and a second switch terminal, and a second inductor connecting to a conductive line. When the switch is at a first position, the selection line is connected to the first switch terminal, and the conductive line is closed to determine the first and second inductors in a parallel coupling condition and the power conversion circuit in a first duty condition. When the switch is at a second position, the selection line is connected to the second switch terminal and the conductive line is open to determine the first and second inductors in a serial coupling condition, and the power conversion circuit in a second duty condition.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
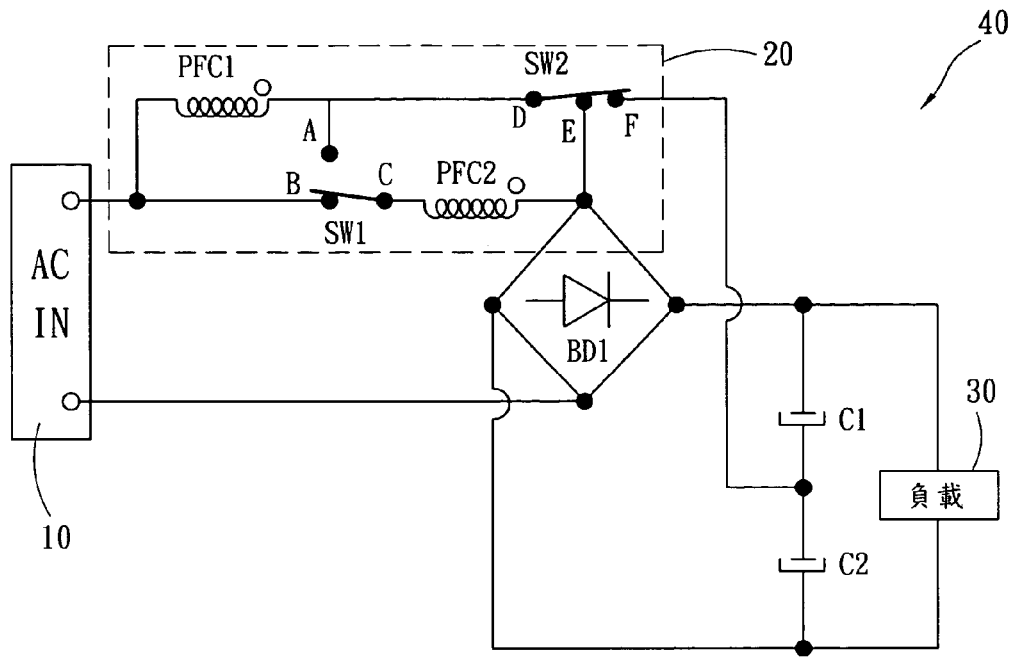
FIG. 1 is a circuit diagram of a first embodiment of the present invention.

Please refer to FIG. 1 for the circuit diagram of a first embodiment of the invention. It includes at least a rectifier BD1 which has a diode cluster and a power factor correction circuit 20 on a power conversion circuit 40 which has two capacitors C1 and C2. The power conversion circuit 40 mainly aims to convert an input AC power supply 10 to DC power to supply a load 30. The circuit includes techniques such as rectification, filtering and voltage transformation and the like. As the technique of the equivalent circuit of the power conversion circuit 40 is known in the art, its details are omitted hereinafter.

The power factor correction circuit 20 contains a first inductor PFC1 and a second inductor PFC2. The first inductor PFC1 and the second inductor PFC2 are coils winding on a same iron core in a parallel manner. The power factor correction circuit 20 is electrically connected to a switch 60. The switch 60 has a first position and a second position to determine the first inductor PFC1 and the second inductor PFC2 in a serial coupling condition and a parallel coupling condition, and also determine the power conversion circuit 40 in a first duty condition and a second duty condition. The switch 60 has six terminals A, B, C, D, E and F. Three terminals A, B and C form a selection line between the first inductor PFC1 and the second inductor PFC2 that has the first switch terminal B and the second switch terminal A. The other three terminals D, E and F are connected to the first inductor PFC1 to form a conductive line. The conductive line has the first terminal E connecting to the second inductor PFC2 and the second terminal F bridging the two capacitors C1 and C2. When the switch 60 is at the first position, the selection line is connected to the first switch terminal B, and the conductive line is closed (namely the terminals DEF are connected) to determine the first inductor PFC1 and the second inductor PFC2 in the parallel coupling condition, and the power conversion circuit 40 in the first duty condition (such as 110V AC input power supply 10). Meanwhile, the power factor correction circuit 20 has a lower inductance. But since the first and second inductors PFC1 and PFC2 are coupled in parallel, the larger current is divided. Hence the entire circuit can be protected.

Figure 2:
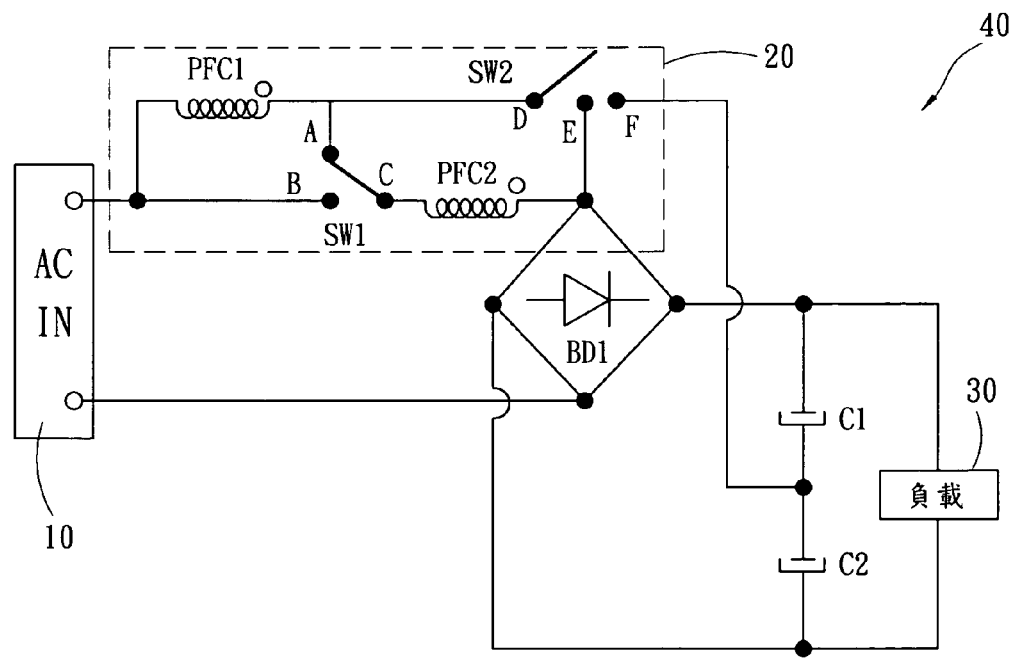
FIG. 2 is a circuit diagram of a second embodiment of the present invention.

Referring to FIG. 2, when the switch 60 is at the second position, the selection line is connected to the second switch terminal A, and the conductive line is open (the terminals D, E, and F are not connected) to determine the first and second inductors PFC1 and PFC2 in the serial coupling condition, and the power conversion circuit 40 in the second duty condition (such as 220V AC input power supply). Meanwhile, the power factor correction circuit 20 has a higher inductance. It can better meet the inductance requirement of the larger power supply 10. And the "resonant wave distortion" can be reduced.

Figure 3A:
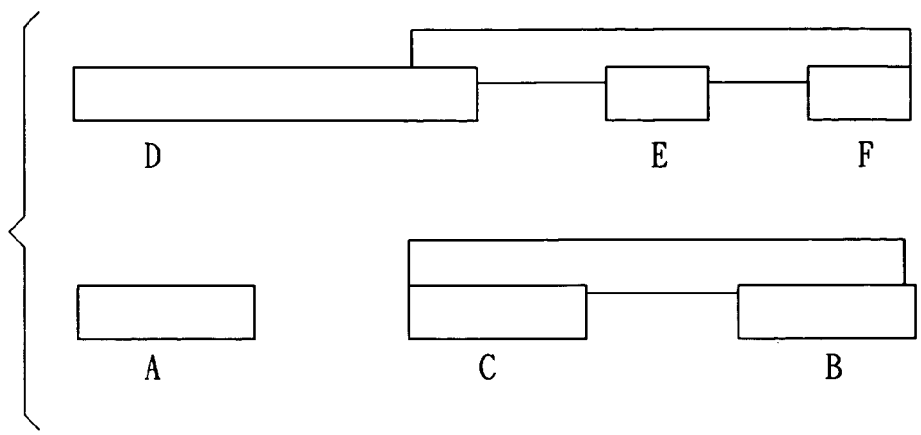
FIGS. 3A and 3B are schematic views of a first embodiment of the switch of the invention.
Figure 3B:
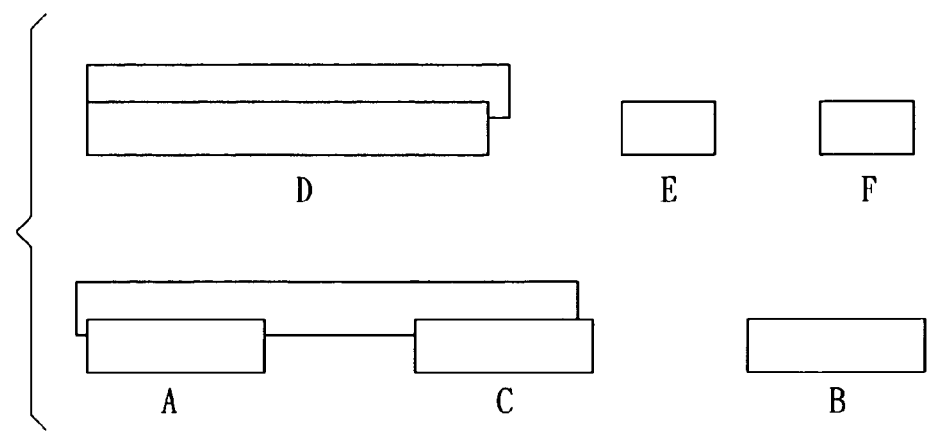
Figure 4A:
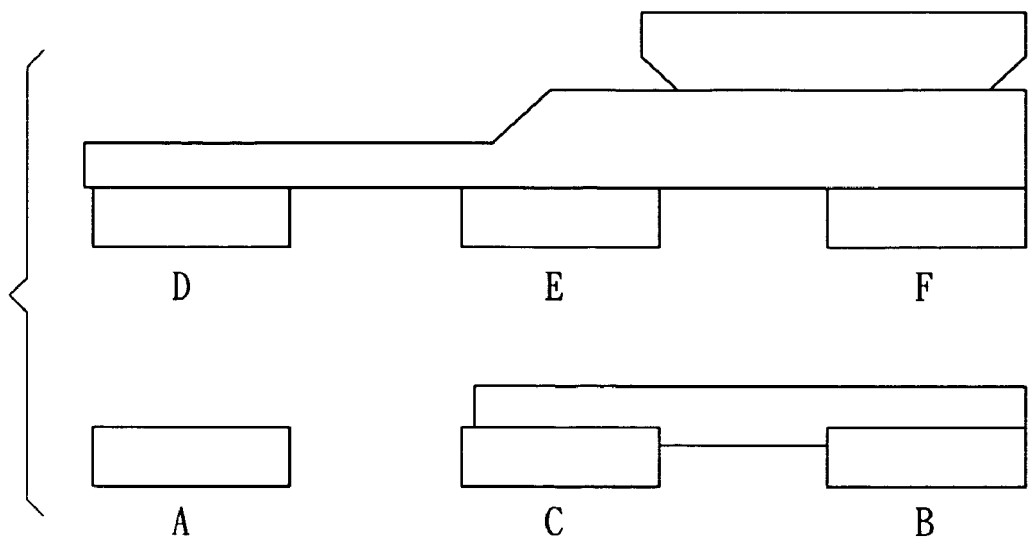
FIGS. 4A and 4B are schematic views of a second embodiment of the switch of the invention.
Figure 4B:
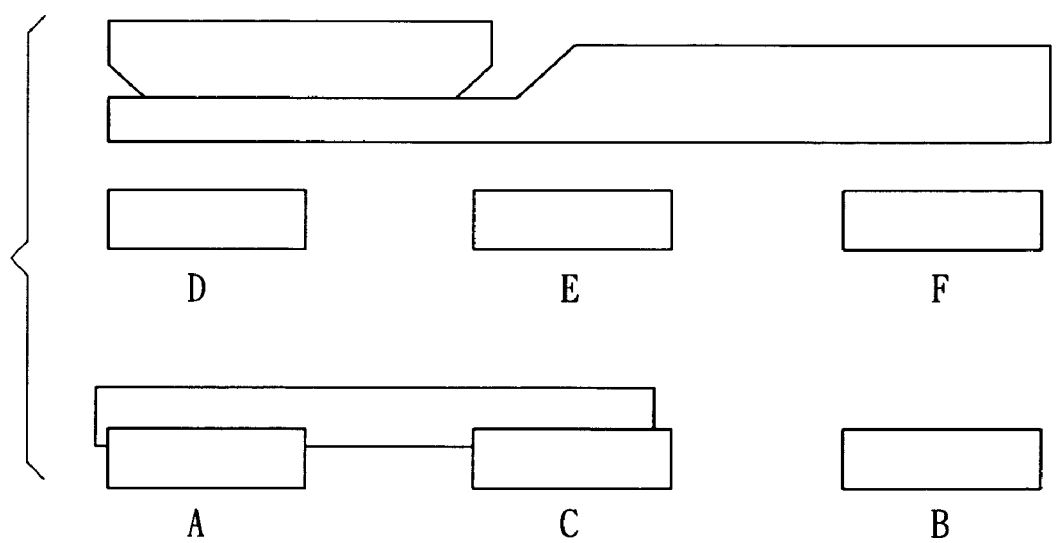
Figure 5A:
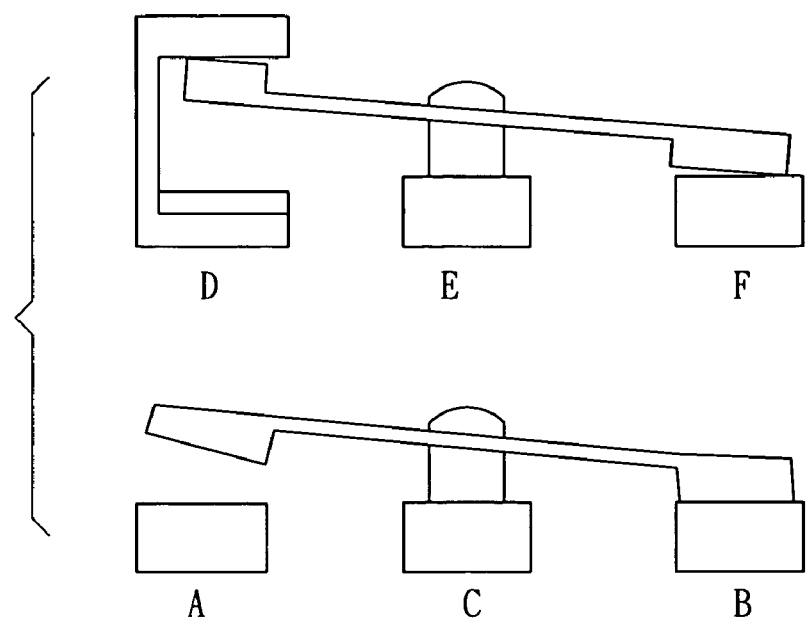
FIGS. 5A and 5B are schematic views of a third embodiment of the switch of the invention.
Figure 5B:
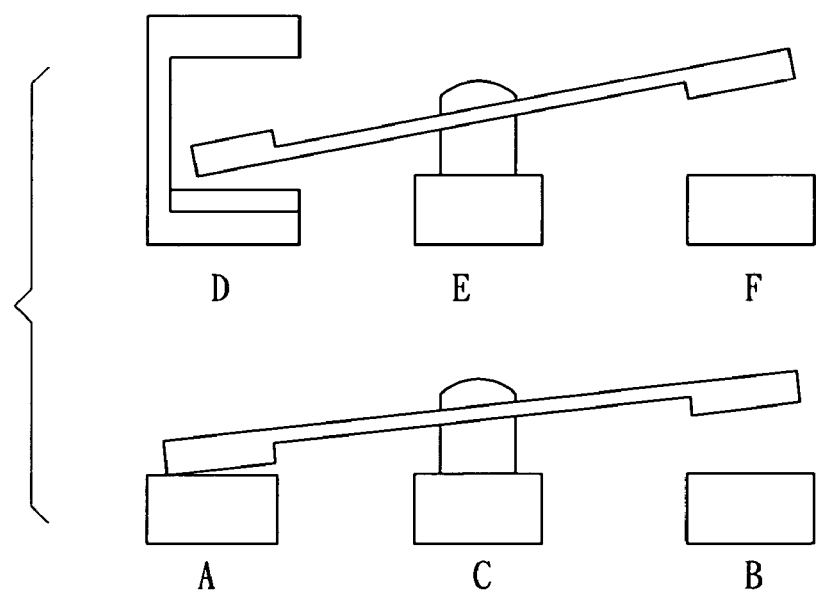
Figure 6A:
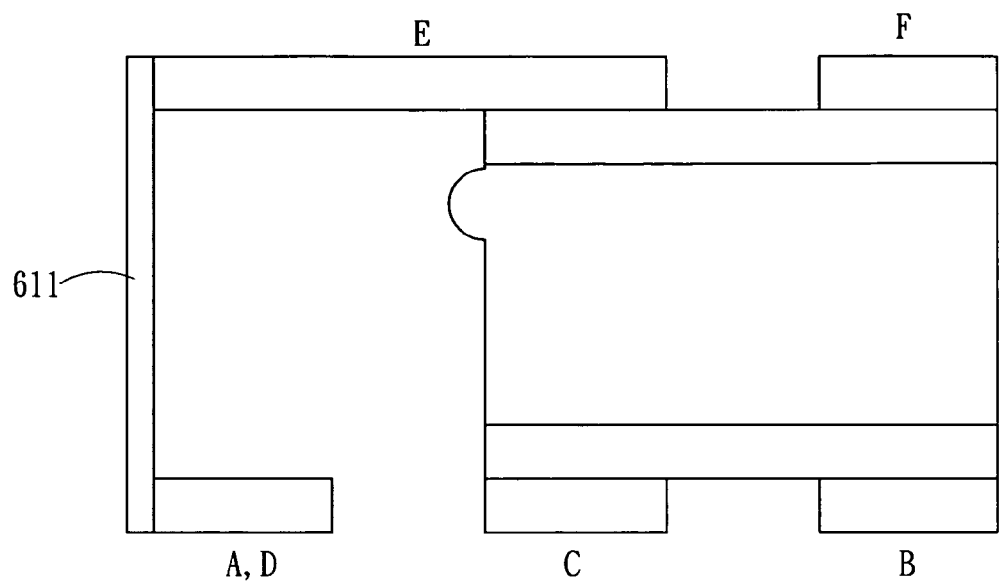
FIGS. 6A and 6B are schematic views of a fourth embodiment of the switch of the invention.
Figure 6B:
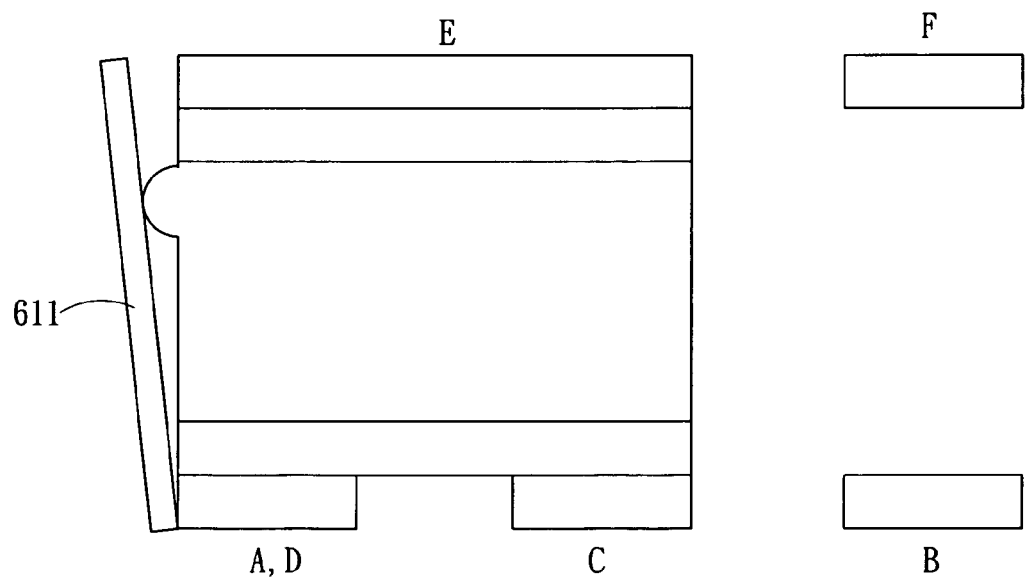

Refer to FIG. 3A for an embodiment of a first switch. As the switch of six terminals A, B, C, D, E and F can achieve parallel or serial coupling for the first inductor PFC1 and second inductor PFC2, the existing switch of six terminals A, B, C, D, E and F can be formed in a sliding switch shown in FIGS. 3A and 3B, a button switch shown in FIGS. 4A and 4B, a toggle switch shown in FIGS. 5A and 5B, or a sliding switch with a common terminal shown in FIGS. 6A and 6B. In FIGS. 3A, 4A, 5A and 6A, the switch 60 is at the first position (the terminals D, E, and F are closed and connected and the terminals B and C are closed and connected), namely the first and second inductors PFC1 and PFC2 are in the parallel coupling condition, and the power conversion circuit 40 is in the first duty condition. In FIGS. 3B, 4B, 5B and 6B, the switch 60 is at the second position (the terminals D, E, and F are open and not connected, and the terminal A, C is closed and connected), namely the first and second inductors PFC1 and PFC2 are in the serial coupling condition, and the power conversion circuit 40 is in the second duty condition.

Figure 7:
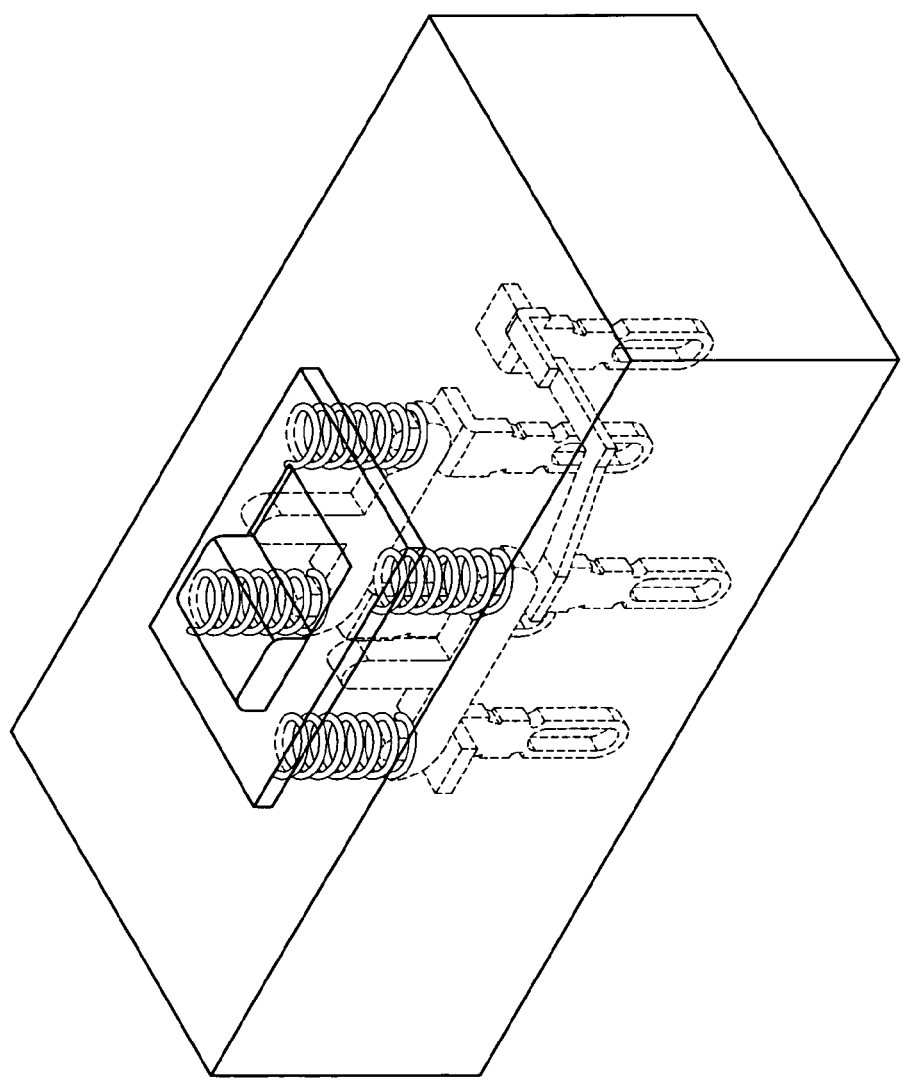
FIG. 7 is a perspective view of a sliding switch of the present invention.
Figure 8:
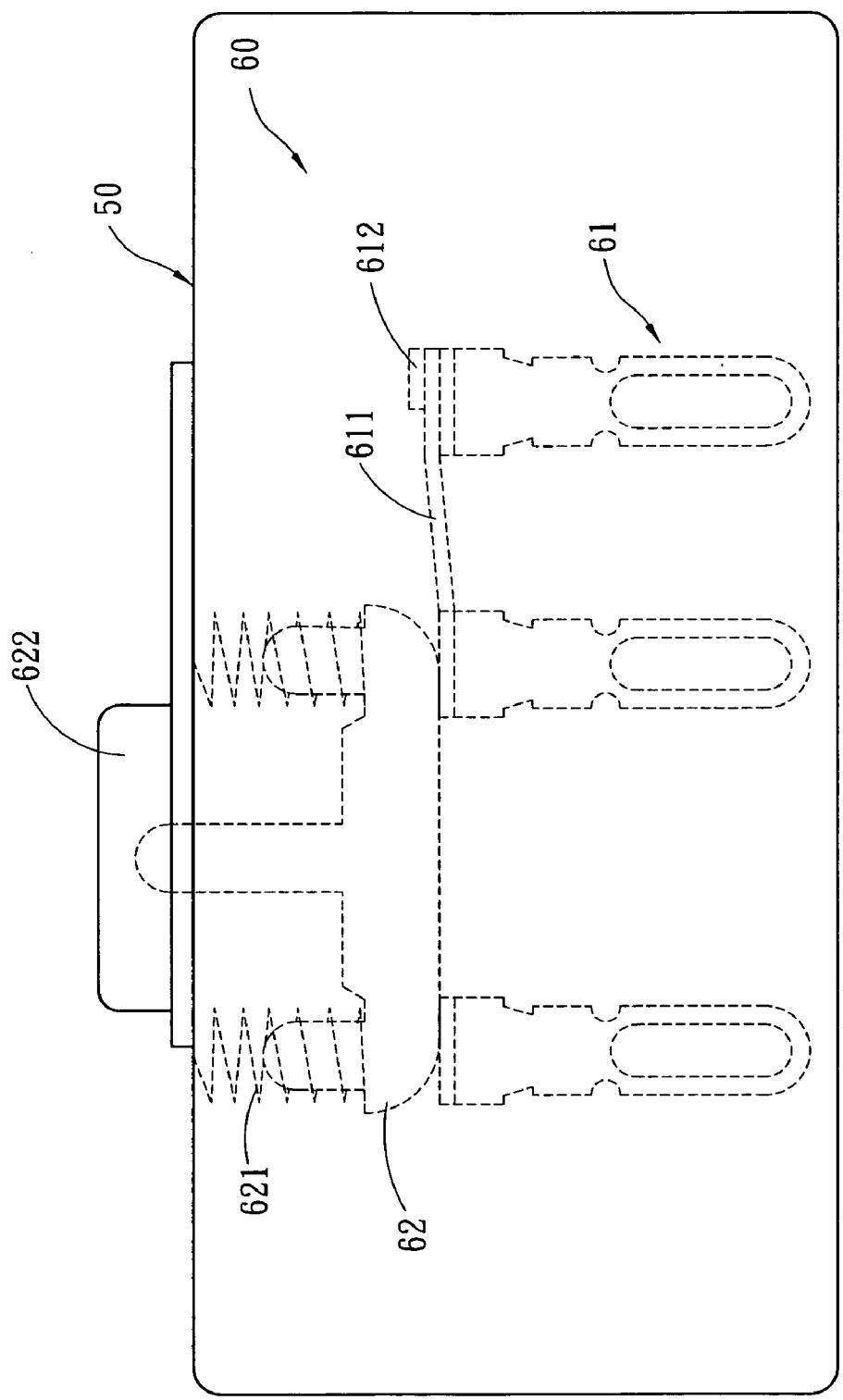
FIG. 8 is a side view of a sliding switch of the present invention.
Figure 9A:
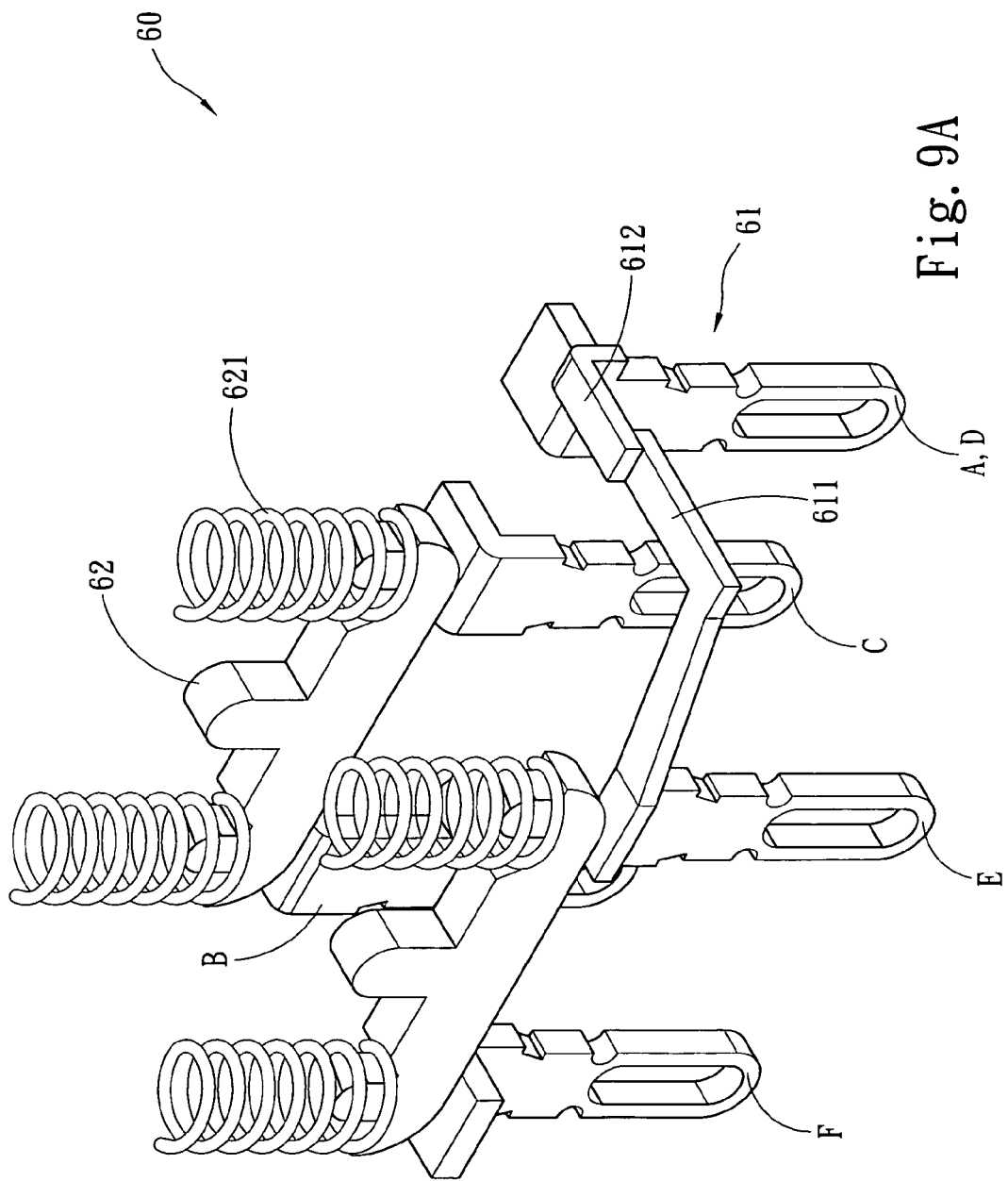
FIGS. 9A and 9B are schematic views of the sliding switch of the invention in operating conditions.
Figure 9B:
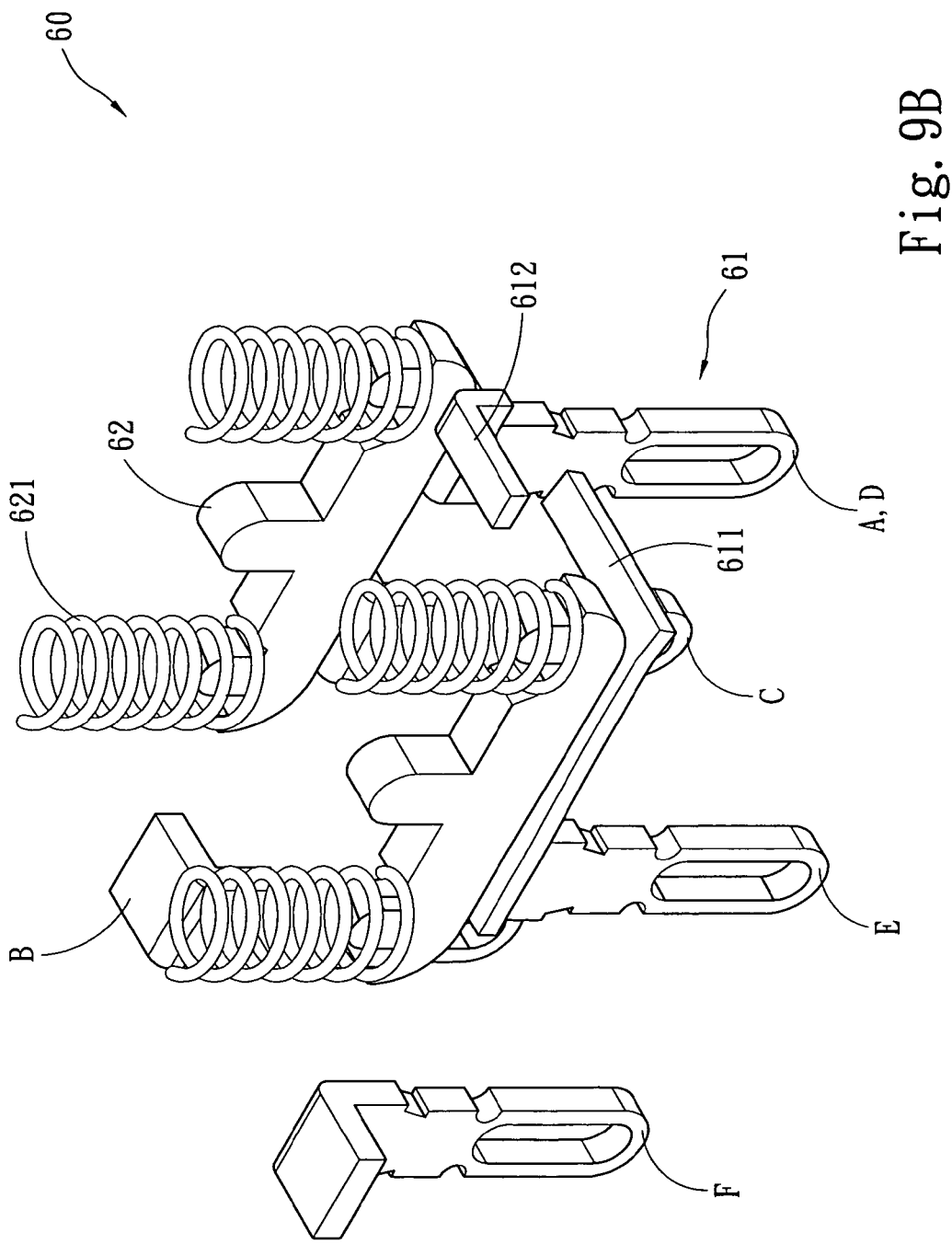

Referring to FIGS. 7 and 8, the switch 60 for connecting the selection line and the conductive line is located in a hollow switch dock 50. The switch 60 has a terminal set 61 which is coupled with a sliding switch 62. The sliding switch 62 has a switch button 622 to enable users to move the sliding switch 62. The sliding switch 62 and the switch dock 50 are interposed by an elastic element 621 which is under a selected and compressed elastic force to stabilize the coupling relationship between the terminal set 61 and the sliding switch 62. Referring to FIG. 9A, the terminal set 61 has four terminals A, B, E and F corresponding to the first position and second position of the switch 60. Other two terminals C and D form a common terminal C, D that have two sliding switch points. The common terminal C is on the selection line, while the switch terminal E is on the conductive line. One of the terminals is extended to form an extended terminal 611. The common terminal A, D is extended to form an extension 612 corresponding and connecting to the extended terminal 611 so that the two connecting terminals are in a short circuit condition in normal conditions to determine the first duty condition. Referring to FIG. 9B, the extended terminal 611 and the extension 612 of the common terminal are in an electricity open condition to determine the second duty condition. Moreover, the common terminal A, D may also be extended to form the extended terminal 611, or the connecting condition of the two connected terminals is formed the extended terminal 611 extended from the two connected terminals. Hence the electricity connecting condition formed between the common terminal A, D and the extended terminal 611 is determined by the moving relationship of the switch button 622 and the sliding switch 62 to form the first duty or second duty condition, thereby to achieve the maximum benefits of the invention.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An improved switch for power factor correction circuits, comprising at least one rectifier and a power factor correction circuit on a power conversion circuit which has two capacitors, the power factor correction circuit having a first inductor and a second inductor and being electrically connected to a switch, the switch having a first position and a second position to determine the first inductor and the second inductor in a serial coupling condition and a parallel coupling condition and determine the power conversion circuit in a first duty condition and a second duty condition;
   wherein the first inductor and the second inductor are bridged by a selection line which has a first switch terminal and a second switch terminal, the first inductor being connected to a connection line which has a first terminal connecting to the second inductor and a second terminal bridging the two capacitors such that when the switch is located on the first position the selection line is connected to the first switch terminal and the connection line is closed and connected to determine the first inductor and the second inductor in the parallel coupling condition and the power conversion circuit in the first duty condition; and when the switch is located on the second position the selection line is connected to the second switch terminal and the connection line is open and not connected to determine the first inductor and the second inductor in the serial coupling condition and the power conversion circuit in the second duty condition,
   wherein the switch has six terminals.

2. The improved switch for power factor correction circuits of claim 1, wherein first inductor and the second inductor are coils winding on a same iron core in a parallel manner.

3. The improved switch for power factor correction circuits of claim 1, wherein the switch is a sliding switch which has six terminals.

4. The improved switch for power factor correction circuits of claim 1, wherein the switch is a button switch which has six terminals.

5. The improved switch for power factor correction circuits of claim 1, wherein the switch is a toggle switch which has six terminals.

6. The improved switch for power factor correction circuits of claim 1, wherein the selection line and the connection line have a common terminal, one of the first terminal and the second terminal being extended to form an extended terminal, the extended terminal and the common terminal forming a short circuit condition in normal conditions to determine the first inductor and the second inductor in the parallel coupling condition, and the first inductor and the second inductor in the serial coupling condition when electricity is in an open condition.

7. The improved switch for power factor correction circuits of claim 6, wherein the extended terminal is formed by extending the common terminal.

8. The improved switch for power factor correction circuits of claim 6, wherein the electricity position of the common terminal is one of the first switch terminal and the second switch terminal of the selection line, and another common terminal switchable between one of the first terminal and the second terminal on the connection line.

9. The improved switch for power factor correction circuits of claim 6, wherein the switch includes a hollow switch dock which holds the terminals, each of the terminals being coupled with a sliding switch, the sliding switch and the switch dock being interposed by an elastic element of a selected and compressed elastic force to form the short circuit condition for the extended terminal in normal conditions and the electricity open condition.

10. An improved switch for power factor correction circuits, comprising at least one rectifier and a power factor correction circuit on a power conversion circuit which has two capacitors, the power factor correction circuit having a first inductor and a second inductor and being electrically connected to a switch, the switch having a first position and a second position to determine the first inductor and the second inductor in a serial coupling condition and a parallel coupling condition and determine the power conversion circuit in a first duty condition and a second duty condition;

wherein the switch has six terminals, the first inductor and the second inductor being bridged by a selection line which has three terminals, the first inductor being connected to a connection line which has other three terminals such that when the switch is located on the first position the connection line is closed and connected, and the selection line determines the first inductor and the second inductor in the parallel coupling condition and the power conversion circuit in the first duty condition; and when the switch is located on the second position the connection line is in an open condition and the selection line determines the first inductor and the second inductor in the serial coupling condition and the power conversion circuit in the second duty condition.

11. The improved switch for power factor correction circuits of claim 10, wherein four terminals of the six terminals of the selection line and the connection line correspond to the first position and the second position of the switch to become switch terminals, and other two terminals form a common terminal which has two switchable points.

12. The improved switch for power factor correction circuits of claim 11, wherein one of the switch terminals and the common terminals of the connection line are formed by another common terminal and an extended terminal extended from one of the terminals of the connection line, the extended terminal being in a short circuit condition in normal conditions to determine the first inductor and the second inductor in the parallel coupling condition, and the extended terminal being in an electricity open condition to determine the first inductor and the second inductor in the serial coupling condition.

13. The improved switch for power factor correction circuits of claim 12, wherein the extended terminal is formed by extending the common terminal.

14. The improved switch for power factor correction circuits of claim 12, wherein the switch includes a hollow switch dock which holds the terminals, each of the terminals being coupled with a sliding switch, the sliding switch and the switch dock being interposed by an elastic element of a selected and compressed elastic force to form the short circuit condition and the electricity open condition for the extended terminal in normal conditions.

* * * * *